(12) United States Patent
Dai et al.

(10) Patent No.: US 8,559,580 B2
(45) Date of Patent: Oct. 15, 2013

(54) ASYNCHRONOUS CALIBRATION FOR EYE DIAGRAM GENERATION

(75) Inventors: Xingdong Dai, Whitehall, PA (US);
Dwight David Daugherty, Ephrata, PA (US); Max J. Olsen, Mertztown, PA (US); Lane A. Smith, Easton, PA (US); Geoffrey Zhang, Allentown, PA (US)

(73) Assignee: LSI Corporation, San Jose, CA (US)

( * ) Notice: Subject to any disclaimer, the term of this patent is extended or adjusted under 35 U.S.C. 154(b) by 1109 days.

(21) Appl. No.: 12/494,771

(22) Filed: Jun. 30, 2009

(65) Prior Publication Data
US 2010/0329318 A1    Dec. 30, 2010

(51) Int. Cl.
*H04L 7/00* (2006.01)
*H04L 25/00* (2006.01)
*H04L 25/40* (2006.01)

(52) U.S. Cl.
USPC .......................................... 375/371; 375/354

(58) Field of Classification Search
USPC .......................................................... 375/371
See application file for complete search history.

(56) References Cited

U.S. PATENT DOCUMENTS

| | | | |
|---|---|---|---|
| 2006/0222123 A1* | 10/2006 | Mobin et al. | 375/348 |
| 2007/0002990 A1* | 1/2007 | Lee et al. | 375/355 |
| 2008/0191766 A1* | 8/2008 | Azimi et al. | 327/170 |
| 2008/0320324 A1* | 12/2008 | Ke et al. | 713/401 |
| 2010/0002822 A1* | 1/2010 | Arima et al. | 375/371 |
| 2010/0219996 A1* | 9/2010 | Abel et al. | 341/120 |
| 2012/0014460 A1* | 1/2012 | Aziz et al. | 375/257 |

* cited by examiner

*Primary Examiner* — Erin File
(74) *Attorney, Agent, or Firm* — Ryan, Mason & Lewis, LLP

(57) ABSTRACT

Techniques are disclosed for asynchronous calibration for eye diagram generation. For example, a method for calibrating a process for generating a data eye associated with a received signal comprises the following steps. Samples of the received signal are obtained for a first unit interval using a first data latch and a roaming latch. A delay offset is determined between the first data latch and the roaming latch by comparing at least one sample obtained using the first data latch and at least one sample obtained using the roaming latch, wherein the delay offset determined by the comparison is used to calibrate the process for generating the data eye associated with the received signal. A similar comparison may be done for a second data latch and used to calibrate the process. The method is able to find the accurate position of each data latch with respect to the roaming latch so as to improve the accuracy of data decoding in a digital receiver, i.e., provide receiver optimization.

25 Claims, 18 Drawing Sheets

(a)

(b)

600

700

+1000ppm, 1010 PATTERN, XOR COUNTER OUTPUT FOR A 4-UI ARCHITECTURE

| 0% HITS | 0 | 0 | 0 | 0 | 0 | 0 | 0 | 0 | 0 |
|---|---|---|---|---|---|---|---|---|---|
| ↑ | 10 | 10 | 10 | 10 | 10 | 10 | 10 | 10 | 10 |
| | 25 | 25 | 30 | 40 | 40 | 40 | 30 | 25 | 25 |
| | 25 | 30 | 40 | 50 | 50 | 50 | 30 | 30 | 25 |
| | 40 | 40 | 50 | 50 | 50 | 50 | 50 | 40 | 40 |
| | 60 | 60 | 50 | 50 | 50 | 50 | 50 | 60 | 60 |
| | 75 | 70 | 60 | 50 | 50 | 50 | 60 | 70 | 75 |
| | 75 | 75 | 70 | 70 | 70 | 70 | 70 | 75 | 75 |
| | 90 | 90 | 90 | 90 | 90 | 90 | 90 | 90 | 90 |
| 100% | 100 | 100 | 100 | 100 | 100 | 100 | 100 | 100 | 100 |

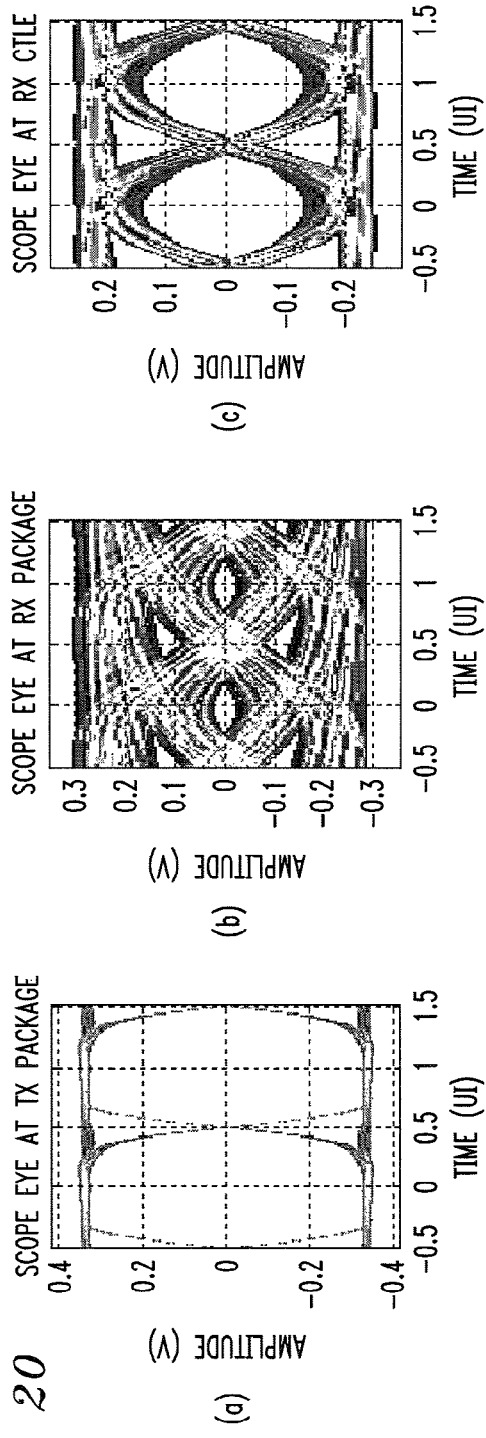
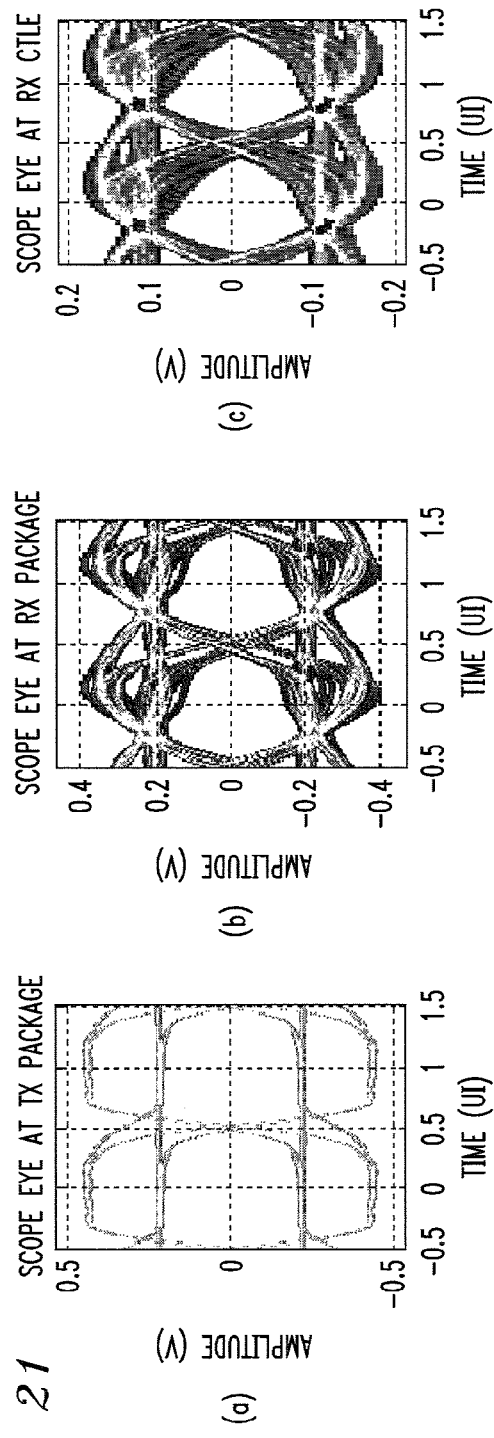
FIG. 20
FIG. 21

1

ASYNCHRONOUS CALIBRATION FOR EYE DIAGRAM GENERATION

FIELD OF THE INVENTION

The present invention is related to data communication networks and, more particularly, to techniques for use in eye diagram generation in receiver systems of such serial communication systems.

BACKGROUND OF THE INVENTION

An eye diagram is a valuable tool in the study of serial data communication systems. The diagram is formed by overlapping sampled signal waveforms over a specified time interval. An eye diagram provides a qualitative means to evaluate link performance and to troubleshoot system issues. Careful analysis of this visual display can offer insights into channel impairments such as inter-symbol interference (ISI) and yield a first order approximation of signal-to-noise and clock timing jitter.

The eye diagram has been offered as an indispensable feature for most oscilloscope vendors such as Agilent (Santa Clara, Calif.), Tektronix (Beaverton, Oreg.), and Synthesis Research Inc (Menlo Park, Calif.). Many physical layer integrated circuit (IC) providers are also beginning to include an on-chip eye capture and display feature as a part of serializer and deserializer (SerDes) product offering.

SUMMARY OF THE INVENTION

Illustrative embodiments of the present invention provide improved eye diagram generation. In particular, inventive techniques provide for asynchronous calibration for eye diagram generation.

In accordance with one broad aspect of the invention, a method for calibrating a process for generating a data eye associated with a received signal comprises the following steps. Samples of the received signal are obtained for a first unit interval using a first data latch and a roaming latch. A delay offset is determined between the first data latch and the roaming latch by comparing at least one sample obtained using the first data latch and at least one sample obtained using the roaming latch, wherein the delay offset determined by the comparison is used to calibrate the process for generating the data eye associated with the received signal.

Further, samples of the received signal may be obtained for at least a second unit interval using at least a second data latch and the roaming latch. A delay offset may then be determined between the second data latch and the roaming latch by comparing at least one sample obtained using the second data latch and at least one sample obtained using the roaming latch, wherein the delay offset determined by the comparison between the samples of the first data latch and the roaming latch and the delay offset determined by the comparison between the samples of the second data latch and the roaming latch are used to calibrate the process for generating the data eye associated with the received signal.

Advantageously, the method is able to find the accurate position of each data latch with respect to the roaming latch so as to improve the accuracy of data capturing in a receiver, i.e., provide receiver parameter optimization.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 20 shows an over-equalized received signal due to a strong transmitter pre-emphasis, according to an embodiment of the invention.

FIG. 21 shows an over-equalized received signal due to a strong transmitter pre-emphasis without high frequency suppression, according to an embodiment of the invention.

DETAILED DESCRIPTION OF THE INVENTION

The invention will be illustrated herein in conjunction with exemplary communication systems, receivers and receiver components. It should be understood, however, that the invention is more generally applicable to other types of communication systems and receivers, and may be implemented using other receiver component arrangements. For example, the techniques disclosed herein can be adapted in a straightforward manner for use in any communication system comprising one or more serial links in which it is desirable to provide improved eye diagram generation so as to facilitate operation of communication systems at high data rates.

Before describing principles of the present invention and issues that have motivated their creation, a general description of a portion of a communication system with which one or more of such inventive principles may be implemented is now given.

Figure 1:
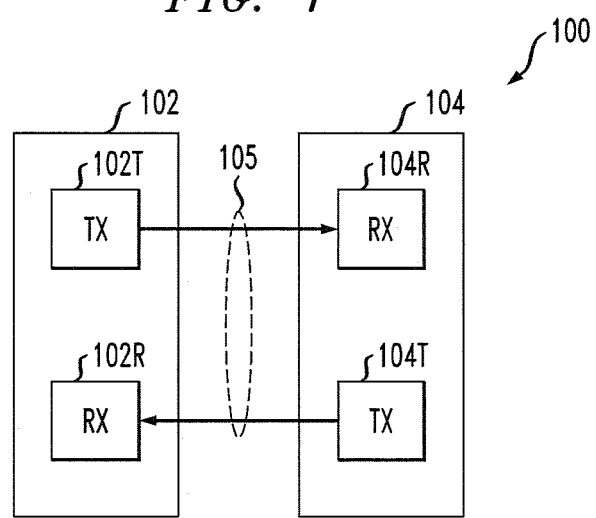
FIG. 1 shows a communication system in which principles of the invention may be implemented.

FIG. 1 shows a portion of such a communication system 100. The system 100 comprises a first node 102 and a second node 104. The two nodes are connected by a bidirectional serial data channel transmission medium 105, also referred to herein as a "link." The first node 102 comprises a transmitter 102T configured for communication with a receiver 104R of the second node 104, and further comprises a receiver 102R configured for communication with a transmitter 104T of the second node 104.

The nodes 102 and 104 may be configured to communicate over serial link 105 in accordance with a known serial communication standard, such as Fibre Channel. Fibre Channel is an American National Standards Institute (ANSI) standard specifying a bidirectional serial data channel, structured for high performance capability. Physically, the Fibre Channel may be viewed as an interconnection of multiple communication points, called N_Ports, interconnected by a link comprising a switching network, called a fabric, or a point-to-point link. Fibre is a general term used to cover all physical media types supported by the Fibre Channel standard, such as optical fiber, twisted pair, and coaxial cable. Additional details regarding these and other aspects of Fibre Channel can be found in the ANSI Fibre Channel standard documents, including the FC-PH, FC-FS, FC-AL-2, FC-PI, FC-DA, FC-MI and FC-LS documents, all of which are incorporated by reference herein.

It is to be appreciated, however, that principles of the present invention can be implemented in communication systems that include other types of serial links, including, for example, serial links configured in accordance with standards such as InfiniBand, IEEE 1394, PCI-Express, Ethernet, Serial Attached SCSI (SAS), Serial Advanced Technology Attachment (SATA), SONET/SDH, etc.

A given one of the nodes 102 or 104 may be configured to operate as a backplane in an illustrative embodiment of the invention. Such a backplane may be used, for example, to interconnect multiple switches, application-specific integrated circuits (ASICs), hard disk drives (HDDs) or other system elements.

The nodes 102, 104 may be viewed as examples of what are more generally referred to herein as communication devices. Such devices may comprise, for example, a SerDes device of the type previously mentioned herein, where "SerDes" refers to serializer/deserializer. That is, in node 102 for example, the transmitter (102T) is considered to be a serializer of a data stream and the receiver (102R) is considered to be a deserializer of a data stream. Thus, while the transmitter and the receiver may operate on different data streams, the device in which they both reside is referred to as a serializer/deserializer (SerDes) device.

A given node may comprise or be part of another type of communication device, such as a router, switch, computer, server, etc. Conventional aspects of such communication devices are well known and therefore not described in detail herein.

Although only two nodes are shown in FIG. 1, other embodiments of the invention may include many more nodes, in any desired configuration.

Also, a full duplex arrangement of the type illustrated in FIG. 1 is not a requirement of the present invention. In other embodiments, for example, transmitter 104T may communicate with a receiver in a node other than node 102, or transmitter 102T may communicate with a receiver in a node other than node 104.

Note that receivers 102R and 104R may each comprise clock and data recovery (CDR) circuitry, which receives an input serial data stream and provides corresponding parallel output streams to additional receiver circuitry in the receiver. The additional receiver circuitry may comprise, for example, signal processing circuitry, switching circuitry, or other types of conventional circuitry typically found in a communication system receiver. Such conventional circuitry, being well understood by those skilled in the art, will not be described in detail herein.

Also included in the receiver 102R or 104R is a processor (not shown) coupled to a memory (not shown). It is understood that the processor may be coupled to the CDR circuitry and one or more other parts of the additional receiver circuitry (cumulatively referred to as "receiver circuitry"). The memory may be configured to store one or more parameters and/or data associated with the functions performed by such receiver circuitry. Such receiver circuitry may be operated at least in part under control of the processor. The memory may therefore store program code that is executed by the processor to implement at least a portion of an equalization process carried out by the receiver. The memory is an example of what is more generally referred to herein as a computer-readable storage medium or other type of computer program product having computer program code embodied therein, and may comprise, for example, electronic memory such as RAM or ROM, magnetic memory, optical memory, or other types of storage devices in any combination. The processor may comprise a microprocessor, CPU, ASIC, FPGA or other type of processing device, as well as portions or combinations of such devices. In other embodiments, at least a portion of the receiver circuitry may be implemented within the processor. Alternatively, the processor may implement at least a portion of the receiver circuitry. It should therefore be apparent that functions of the receiver circuitry may be implemented using various combinations of hardware, software and firmware.

Figure 2:
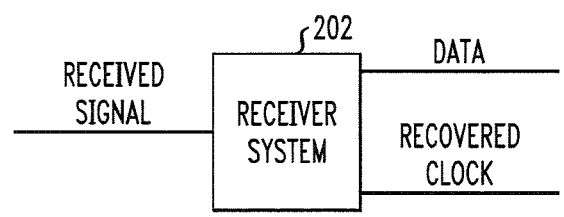
FIG. 2 shows a receiver system in which principles of the invention may be implemented.

FIG. 2 generally illustrates a receiver system that is understood to be part of each of receivers 102R and 104R in FIG. 1. As shown, a received signal is processed by receiver system 202 to generate the decoded data and recovered clock, in a known manner. The receiver system may typically include signal conditioning circuits such as an analog linear equalizer (ALE) or an automatic gain control (AGC), a clock and data recovery (CDR) circuit, and a decision feedback equalizer. Other circuits may be included in the receiver system 202. Generally, circuitry associated with the CDR system adjusts a clock signal generated by a voltage controlled delay line to maintain a phase alignment between the recovered clock and the received signal.

In U.S. Patent Publication No. US2006/0222123, filed Mar. 31, 2005, and entitled "Method and Apparatus for Monitoring a Data Eye in a Clock and Data Recovery System," which is commonly assigned herewith and incorporated by reference herein, a circuit subsystem is described to allow the gathering of statistics of the incoming signal which is subsequently displayed as a data eye. This method utilizes a roaming latch and a data latch. The clock for the roaming latch comes from a clock interpolator which will have a delay or phase offset compared to the clock driving the data latch. The display method is sensitive to the timing difference or delay offset. Design decisions pertinent to the layout and operating conditions such as data rate and process-voltage-temperature (PVT) variations, all contribute to the timing difference. If this difference is not resolved, the eye diagram can not only appear off-centered, but each capture is also a function of operating conditions (such as data rate and PVT) and may not be repeatable.

Figure 3:
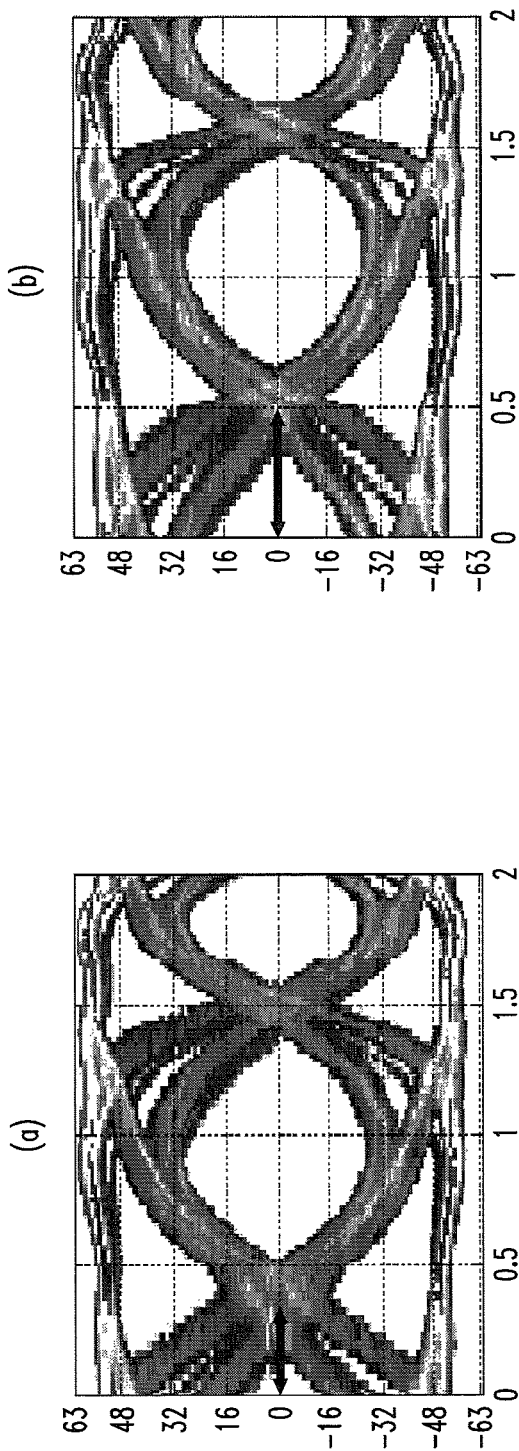
FIG. 3 shows examples of on-chip eye diagrams across 2-UI captured from a serializer/deserializer device.

In FIG. 3, distorted eye diagrams across 2 unit-intervals (UI) are captured from an exemplary SerDes device running at about 8.5 Gbps, with timing offsets at approximately 25/64*UI (FIG. 3(a)) and 34/64*UI (FIG. 3(b)) respectively. The exhibited shift in the eye diagram (denoted by the arrow) makes visual examination very distracting. Because only one eye is fully displayed, hardware resources designed for the 2-UI capture are under-utilized and it requires more effort to discover certain system impairments such as duty cycle distortion, which could induce alternating the "big eye little eye" (BELE) phenomenon. More importantly, since the eye diagram has been used by many on-chip or off-chip software programs for link performance evaluation (margining) and tuning (equalizer adaptation), an unaligned eye diagram greatly complicates and could potentially mislead software development efforts.

To resolve the timing difference, a method of phase calibration may be required for the roaming latch on the bang-bang and the baud rate CDR architectures. These are two commonly used CDR architectures for SerDes applications. In addition, it would be highly desirable to provide direct methods to measure delay offsets between the data latch and the roaming latch for link performance profiling such as margining. Principles of the invention provide such methods.

In particular, principles of the invention provide an asynchronous mode phase calibration method for the roaming latch. This method directly measures the delay offset between the roaming latch and the data latch. The method generates accurate delay measurement across a wide PPM (parts per million) range of frequency offset. Since no transition position is needed as a pre-qualifier, the method is applicable to both bang-bang CDR and baud-rate CDR architectures.

Figure 4:
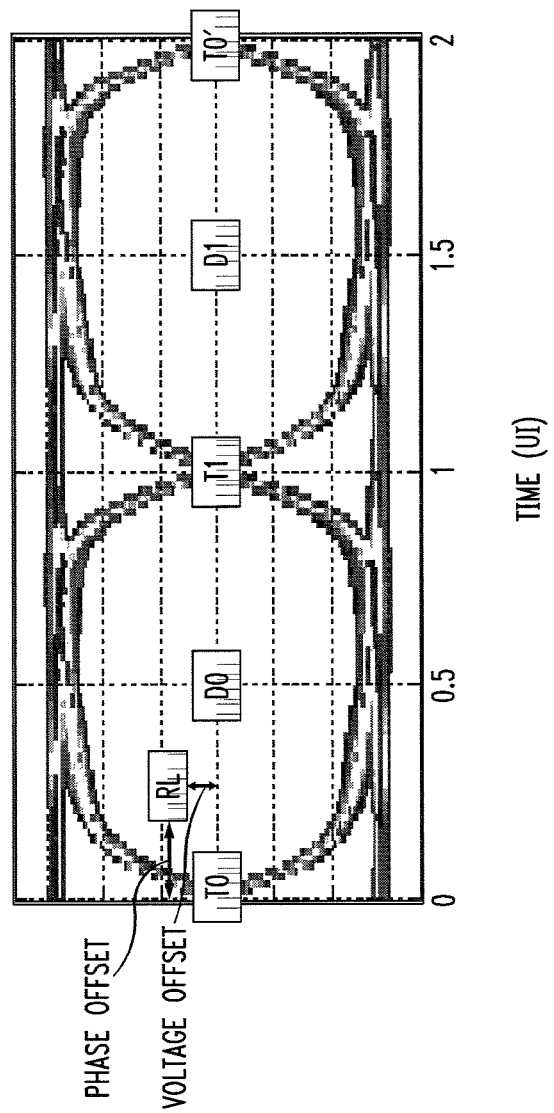
FIG. 4 shows an example of a latch setup operation for a bang-bang clock and data recovery system.

A bang-bang CDR is a widely used architecture in the receiver (deserializer). Such an architecture uses a phase detector, such as a D-type flip-flop, to sample the incoming serial data. The early or late information (transition/edge) is then filtered and drives a voltage controlled oscillator. In FIG. 4, the latch setup in a 2-UI design is illustrated, where T0 and T1 are the first and second transition latches respectively, D0 and D1 are the first and second data latches respectively, and RL is the roaming latch. Ideally, the roaming latch and the transition latch should be co-located when both latches are sampling the receiver signal on the same clock phase. However, under practical situations, both phase and voltage offsets exist due to layout and other factors.

Figure 5:
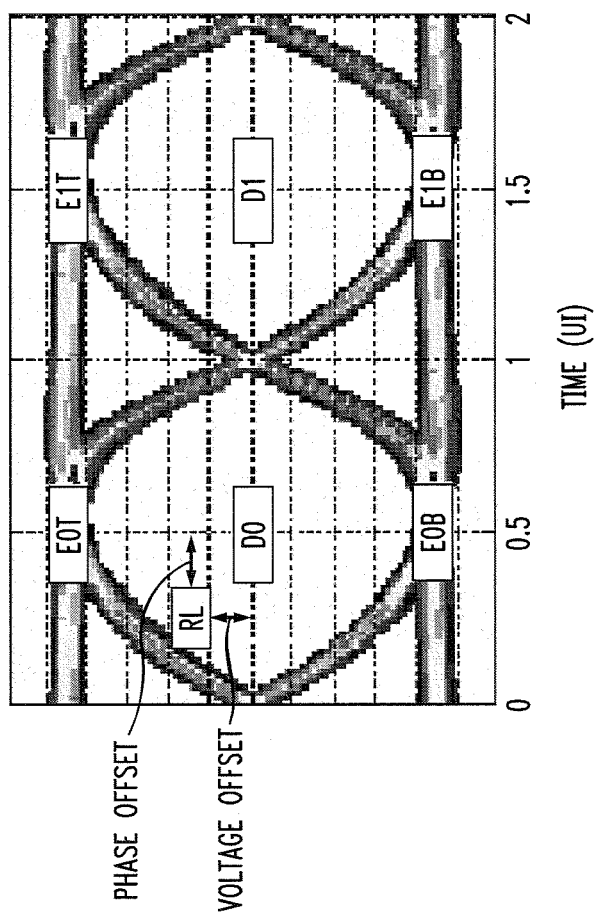
FIG. 5 shows an example of a latch setup operation for a baud-rate clock and data recovery system.

A baud-rate CDR is another widely used architecture in the receiver (deserializer). Such an architecture eliminates the requirement of transition latches. Instead, error latches for equalizer parameter adaptation are also used to obtain the phase information (early/late). In FIG. 5, the latch setup in a 2-UI design is illustrated, where D0 and D1 are the first and second data latches respectively, E0T, E0B, E1T and E1B are the top and bottom error latches for the first and the second UI, and RL is the roaming latch.

We now discuss the effects of roaming latch offset. In a typical bang-bang CDR design, T0, T1, D0 and D1 are carefully laid out to ensure evenly spaced (linear) phase relationship and matched voltage level. Similarly in a baud-rate CDR circuit, the data latches and the error latches are matched well. The roaming latch, however, is often designed with best remaining efforts, primarily due to area constraints. Besides area constraint, the roaming latch is also constrained by the desire to keep RX signal loading in check. Data latches and transition latches take higher priority over the roaming latch in physical placement and resource utilization. Therefore, the roaming latch often has a noticeable phase offset with respect to other latches, and to a lesser degree, a voltage offset as well. The roaming latch plays an important role in receiver tuning and link evaluation such as margining. Finding the correct timing relationship between the roaming latch and other latches is thus desirable because, during those operations, the roaming latch is positioned across the capture scope and false assumptions on the location could lead to distorted eye diagrams and incorrect performance conclusions.

In accordance with principles of the invention, an asynchronous calibration circuit and methodology are provided. An objective of this method is to find the accurate position of the data latch with respect to the roaming latch. In one receiver-side embodiment, for the data latch in each eye or UI, the output is exclusive-ORed (logically XORed) with the output from the roaming latch. The output is then passed to a counter, one for each UI. This configuration can be used to distinguish the two UIs in a 2-UI system and locate the data latch position for each UI. This setup can be expanded in a straightforward manner into a multiple eye capture system, and for UI sampling greater than 2-UI.

Figure 6:
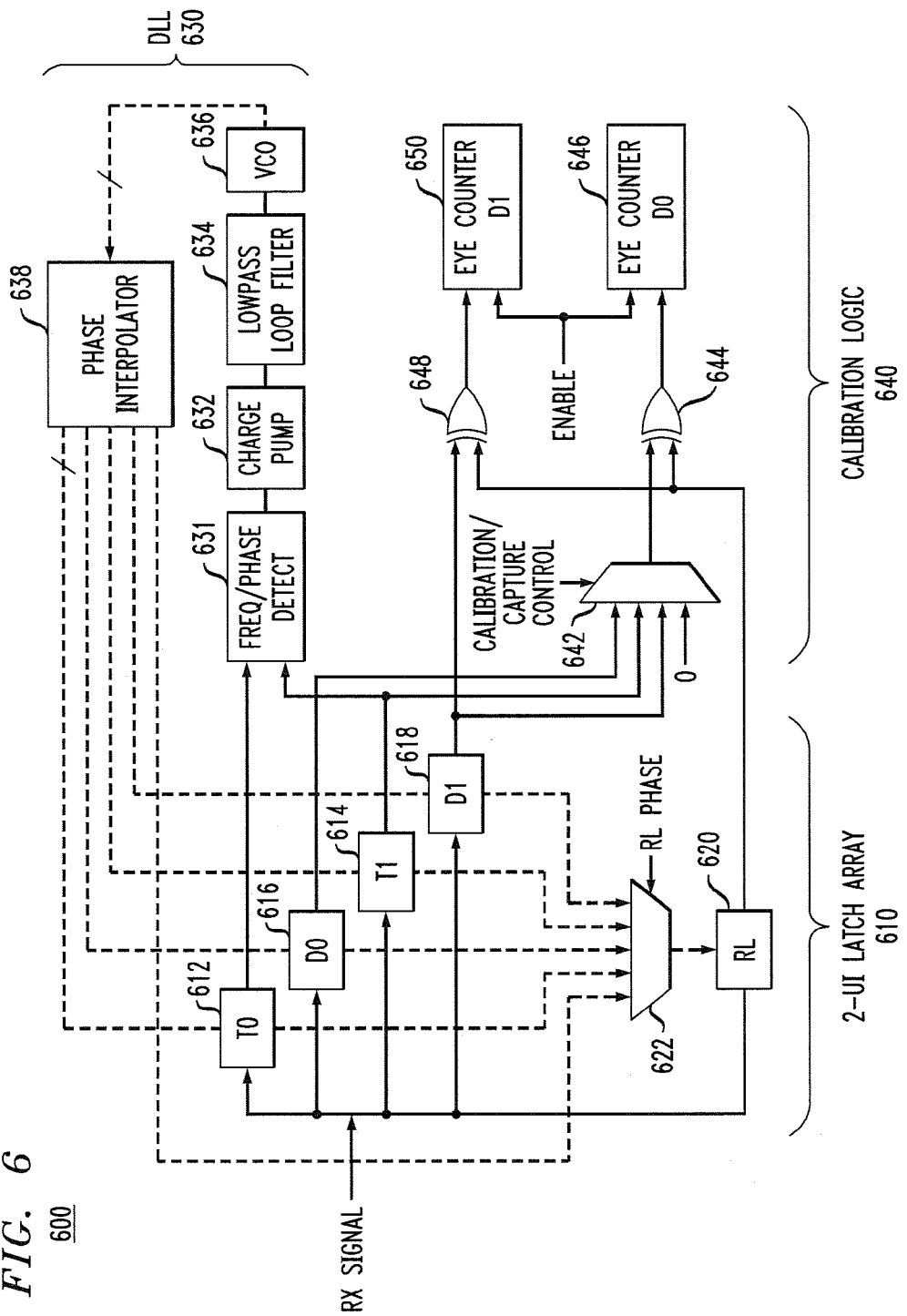
FIG. 6 shows a calibration and eye capture circuit in a receiver with a bang-bang clock and data recovery system, according to an embodiment of the invention.

FIG. 6 illustrates receiver circuitry 600 implementing an illustrative embodiment of the invention. In particular, FIG. 6 illustrates a latch array 610, a delay-locked loop (DLL) 630, and calibration logic 640. The calibration logic 640 is one embodiment that implements the calibration methodology of the invention. Note that receiver circuit 600 may be part of receiver 102R or receiver 104R in FIG. 1.

It is understood that a typical communications receiver will have other functional components, however, for the sake of clarity, only the portions of the receiver that facilitate an understanding of principles of the invention are shown and will be described.

As shown, the 2-UI sampling arrangement of the bang-bang CDR approach in FIG. 6 employs a latch array 610 that includes two data latches, two transition latches, and a roaming latch. These latches are denoted in FIG. 6 as a first transition latch (T0) 612, a second transition latch (T1) 614, a first data latch (D0) 616, a second data latch (D1) 618, and a roaming latch 620. RL phase is controlled by a first multiplexer 622, as shown.

Other embodiments may use other types of sampling arrangements, including 3-UI, 4-UI, 5-UI, etc. However, using a sampling arrangement with a larger UI value will require that the latch array include more latches. The total number of latches required for these other sampling arrangements, if implemented using a bang-bang type latch array, will generally be two times the UI value, not including the roaming latch. Thus, a 3-UI sampling arrangement will require 6 data and transition latches, a 4-UI sampling arrangement will require 8 data and transition latches, and so on. It should be noted that other types of latch arrays may be used, such as baud rate type latch arrays, which generally do not require transition latches, but rather use error latches as explained above.

Also as shown in the DLL 630 of FIG. 6, a phase detector 631 outputs a phase update signal on the transition edges of the received serial signal. If the phase detector 631 detects a phase lag, the phase detector 631 generates a downward control signal, indicating an extent of the phase lag. Likewise, if the phase detector 631 detects a phase lead, the phase detector 631 generates an upward control signal, indicating an extent of the phase lead. The upward and downward control signals are applied to a charge pump 632 that generates a positive or negative current pulse having a pulse width that is proportional to the phase difference. Thereafter, the current pulse generated by the charge pump 632 is integrated by a loop filter 634. The filtered voltage is then applied to a voltage controlled oscillator (VCO) 636. The VCO 636 generates a clock signal with a controlled frequency. The clock signal is provided to a phase interpolator 638. The phase interpolator 638 generates clock signals for controlling the latches of the latch array 610. As is well known, the clock signals generated by the phase interpolator 638 are phase offset (delayed) from one another and are dynamically adjusted in response to the feedback received by the DLL 630. Adjusting of the clock signals permits the latch array 610 to accurately detect the sequential data bits that are received by the receiver, as is also well known.

Further, as shown in FIG. 6, calibration logic 640 includes a second multiplexer 642, a first XOR logic gate 644, a first eye counter 646, a second XOR logic gate 648, and a second eye counter 650. In general, one set of XOR logic gate and eye counter enables determination of the phase offset between the roaming latch and a given data latch, i.e., D0 or D1. That is, the data latch position with respect to the roaming latch is located for each UI.

By way of one example, this is accomplished as follows. The output signal of data latch (D0) 616 is selected via a calibration/capture control signal applied to the multiplexer 642. Thus, the output signal from data latch (D0) 616 is output from the multiplexer 642 to one of the two inputs terminals of XOR logic gate 644. The other input terminal of XOR logic gate 644 receives the output signal from the roaming latch 620. The two signals are compared and the result is counted in the eye counter 646 for each RL phase position across a 2-UI scope field. Similarly, the output signal from data latch (D1) 618 is provided to one of the two inputs terminals of XOR logic gate 648. The other input terminal of XOR logic gate 648 receives the output signal from the roaming latch 620. The two signals are compared and the result is counted in the eye counter 650 for each RL phase position across the 2-UI scope field.

It is to be appreciated that the calibration methodology of the invention can be performed with only one set of XOR logic gate and eye counter, e.g., without the second XOR logic gate 648 and the second eye counter 650. That is, with only one set of XOR logic gate and eye counter, a two-pass calibration procedure can be performed, one for the first data latch (D0) and the other for the second data latch (D1). In such case, multiplexer 642 selects the appropriate data latch output signal for each pass, and provides it to XOR logic gate 644 to be compared with the output of the roaming latch 620. The tradeoff of reduced hardware complexity is extended execution time and increased software complexity.

It is also to be appreciated that while a bang-bang CDR approach is illustrated in FIG. 6, the calibration methodology of the invention can be employed in a straightforward manner in a baud rate CDR system. Recall that, in baud rate CDR, transition latches are not used and edge early/late information is derived differently, i.e., using error latches as explained above.

Figure 7:
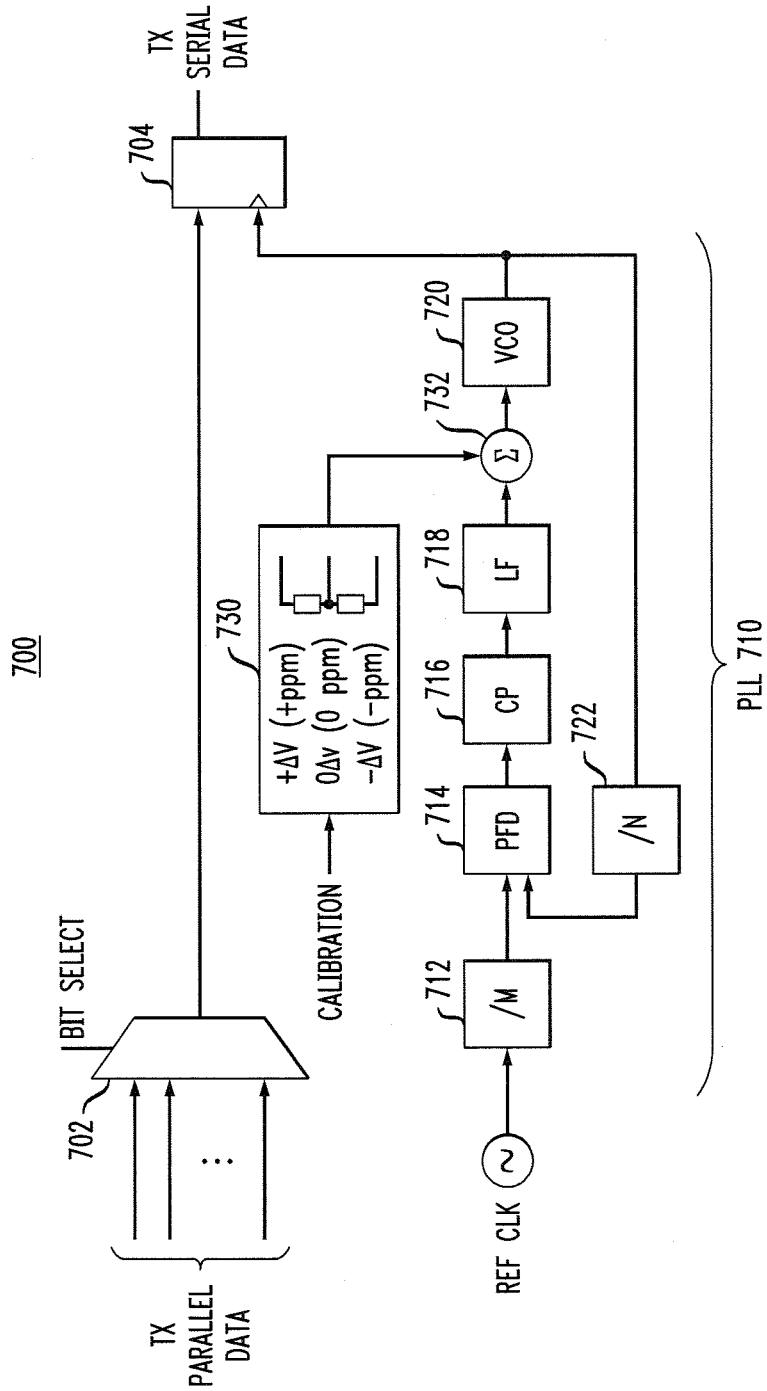
FIG. 7 shows a circuit that supports asynchronous transmission by use of a phase selection mechanism, according to an embodiment of the invention.

We now turn to a discussion of the transmitter from which the RX signal in FIG. 6 is received. FIG. 7 illustrates transmitter circuitry 700 implementing an illustrative embodiment of the invention. In particular, FIG. 7 illustrates a TX bit select multiplexer 702, a TX serial data output latch 704, a phase-locked loop (PLL) 710, calibration voltage divider 730, and summer 732. The phase-locked loop 710 includes typical transmitter components including a frequency divider 712, a phase/frequency detector (PFD) 714, a charge pump 716, a loop filter 718, and a voltage controlled oscillator (VCO) 720, all of which operate in a similar manner to the like-named components described above with respect to the receiver. A frequency divider 722 is also provided. As is well known, the function of the frequency dividers 712 and 722 is to divide the frequency of the input clock signal, resulting in a lower frequency clock signal. For example, a 100 MHz clock signal is divided by 2 (N or M) resulting in a 50 MHz clock signal. PFD 714 is then used to check the phase relationship of the divided reference clock and the divided VCO clock. The use of M and N provide more freedom to match reference clock rate with the requirement of applications (VCO).

The VCO output signal is used to control the timing of the serial data output latch 704, i.e., controls the timing of the serial data that is transmitted to the receiver (and is processed by the receiver as the RX signal). Note that the calibration voltage divider 730 and summer 732 represent one embodiment that implements the calibration methodology of the invention. That is, the calibration voltage divider 730 and summer 732 enable the transmitter to operate asynchronously with respect to the receiver with adaptation frozen at 0-PPM. Pattern marching is realized as the transmitted serial data stream appears non-stationary at the receiver. Also note that transmitter circuitry 700 may be part of transmitter 102T or transmitter 104T in FIG. 1.

It is understood that a typical communications transmitter will have other functional components, however, for the sake of clarity, only the portions of the transmitter that facilitate an understanding of principles of the invention are shown and will be described.

In this embodiment of the invention, the transmitter is equipped with the ability to generate both synchronous (sync TX mode) and asynchronous (async TX mode) data streams. Synchronous TX mode may be accomplished in a conventional manner. However, to generate asynchronous clocks for async TX mode, a mechanism is provided to increase or decrease the loop filter voltage from that which is typically generated in a steady state PLL. The amount of loop filter voltage change translates directly into a frequency change on the transmitted data stream.

In the transmitter embodiment of FIG. 7, the voltage divider 730 (for example, as shown, a resistive ladder) provides both positive and negative frequency offsets, which are applied to the loop filter voltage via the summer 732. This implementation is more general, since the inventive calibration method operates with only a frequency offset and, as such, either positive or negative PPM alone will suffice. In addition, as an alternative, the loop filter voltage can be realized by implementing a programmable reference source, which is even more general, but with additional hardware and higher cost and power associated. If a spread spectrum circuit is part of the transmitter for a PCI-express application, one can alternatively fix the frequency offset to a certain PPM.

In a similar manner, the PPM offset can alternatively be introduced on the receiver side (async RX mode) by adjusting the voltage level of a receiver PLL or DLL from its steady state level, in a similar manner as is done in the transmitter. In one embodiment, both the transmitter and receiver have the ability to implement asynchronous operation, thereby permitting for selection of which device (TX or RX) will provide the function. In another embodiment, asynchronous operation may be performed in part in the transmitter and in part in the receiver.

Figure 8:
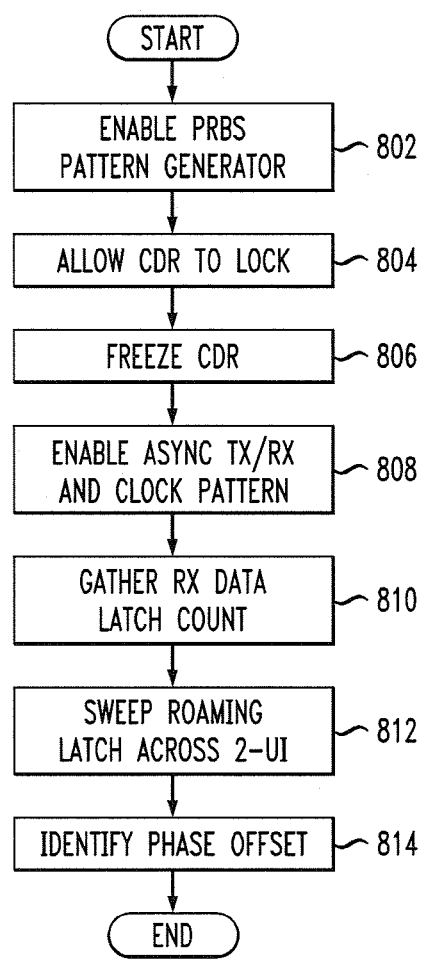
FIG. 8 shows an asynchronous calibration methodology, according to an embodiment of the invention.

FIG. 8 illustrates an embodiment of an asynchronous calibration method 800 according to one embodiment. A key advantage of this method is portability. To this end, the calibration is advantageously integrated into the eye diagram generation flow, as shown in FIG. 8.

By way of further advantage, either transmit or receive side asynchronous mode can be enabled. The calibration can be implemented in a one shot mode to preserve backward compatibility and when speed of generating an eye diagram plot is important. Or it can be configured in a continuous mode, where the calibration procedure is performed for every eye diagram generation and every possible PVT variation is compensated. Depending on the counter size and sampling rate, a calibration can be performed in less than 4 μs (microseconds) at 8.5 Gbps (gigabits per second).

Before the calibration is started, a pseudorandom bit stream (PRBS) generated by a PRBS pattern generator (not shown) or a user data pattern is transmitted (step 802) and the receiver CDR operation adapts and locks to the data stream (step 804).

The calibration circuit does not modify loop filter voltage (0-ΔV or 0-ppm) to a locked PLL. When the calibration mode is selected, CDR operation is frozen to prevent the CDR timing from updating (step 806). Then, LF voltage control is placed under register control with its voltage increased or decreased to create an asynchronous transmit operation (step 808). Alternatively, the method can enable the asynchronous operation on the receive side, thus all eye capture functions are co-located in the receiver and this can be an advantage in implementation and operation. A clock pattern of "1010" is selected for this exemplary discussion of the asynchronous calibration method for simplicity, though a PRBS pattern can also be used. As will be explained below, the usage of a PRBS pattern sometimes is highly desirable, given different receiver architectures.

In TX asynchronous mode, since the receiver has stopped adaptation, the receiver is still running on a synchronous clock phase-locked to the reference clock, the transmitter (with +/−PPM) and the receiver (zero PPM) now operates asynchronously. In this mode, the data pattern appears to slide through the receiver 2-UI gradually. The sliding speed is dependent on the asynchronous PPM offset value.

Receiver data latches for each UI can operate in two modes, fixed mode or independent mode. The most simple setup is the fixed mode where the phase offset between the two data latches is fixed to 180 degree. A more complex architecture is to have each data latch adapting independently.

Figure 9:
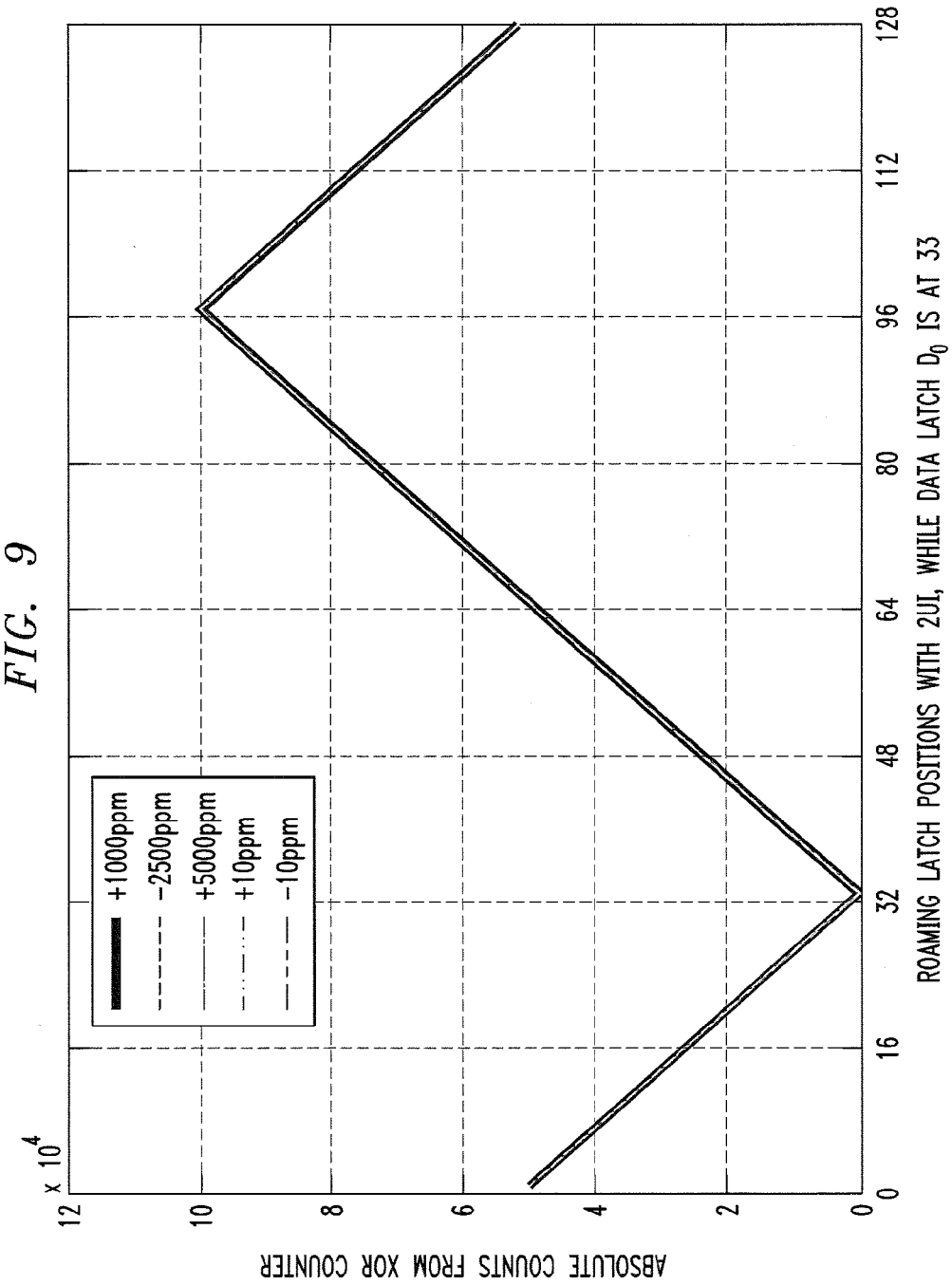
FIG. 9 shows a calibration plot for a frequency offset outside +/−10 PPM, according to an embodiment of the invention.
Figure 10:
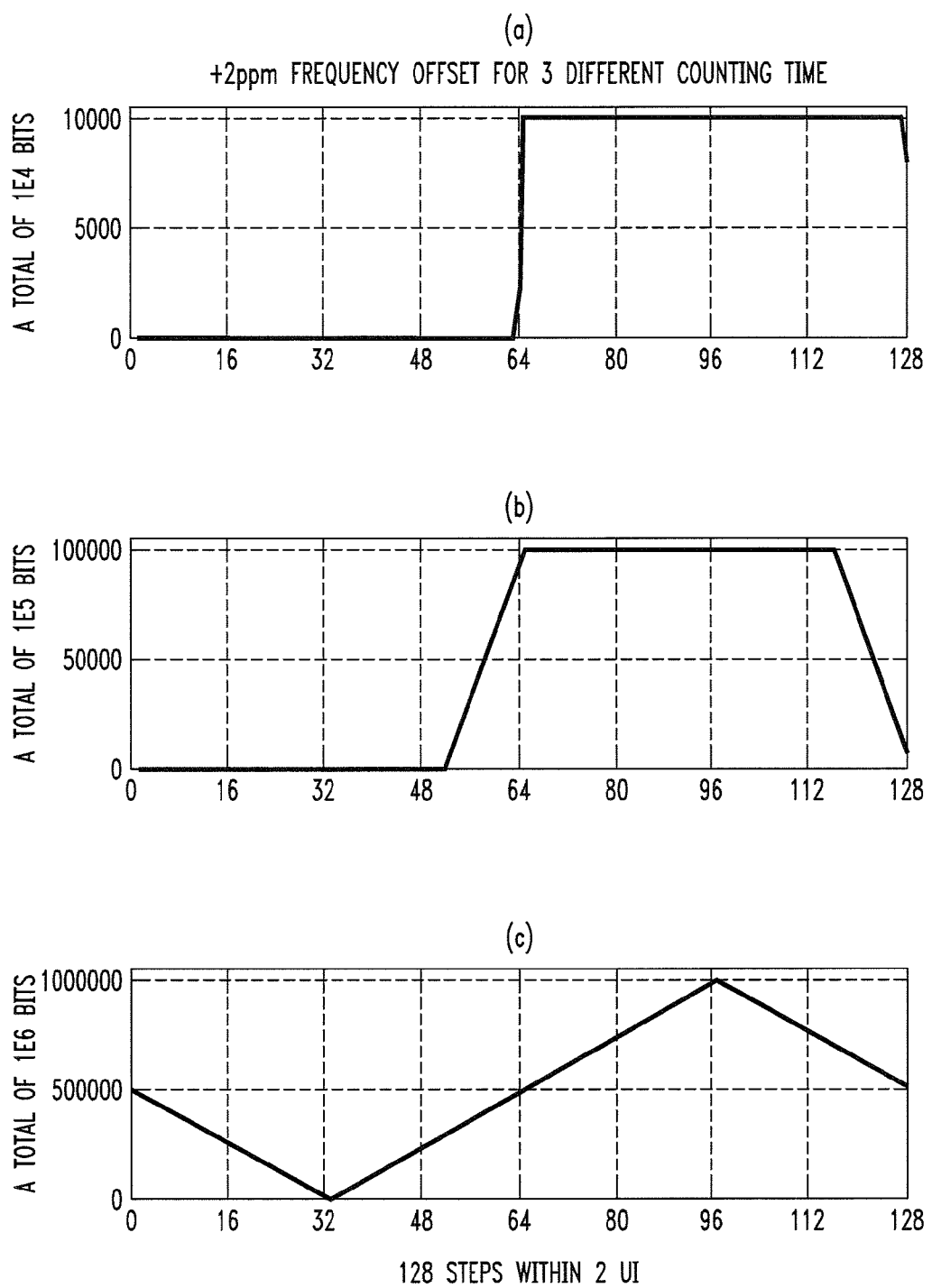
FIG. 10 shows results for +2 PPM for three different count times, according to an embodiment of the invention.

In fixed latch mode, the CDR adapts the data latch in one UI and the other data latch will move in synchronous fashion with the first data latch. For this design, the second XOR gate and eye counter (648 and 650 in FIG. 6) are not needed. When calibration is enabled, one data latch is selected, for example D0. The latch outputs from D0 and RL are combined in the XOR gate and the result is counted for each RL phase position across the 2-UI scope (steps 810 and 812). The minimum value in count corresponds to the phase offset of the data latch in the first UI (D0) and the maximum value is the phase offset for the second UI (D1) (step 814). FIG. 9 shows reliable calibration results for asynchronous frequency offset as small as +/−10 PPM. When PPM is within +/−10 PPM, the sliding rate of the transmit data is very slow. In order to achieve a successful calibration, for relatively small PPM offsets, counting time needs to be increased. FIG. 10 demonstrates this realization via simulated results at +2 PPM for three different count times; $10^4$ (FIG. 10(a)), $10^5$ (FIG. 10(b)), and $10^6$ (FIG. 10(c)).

Figure 11:
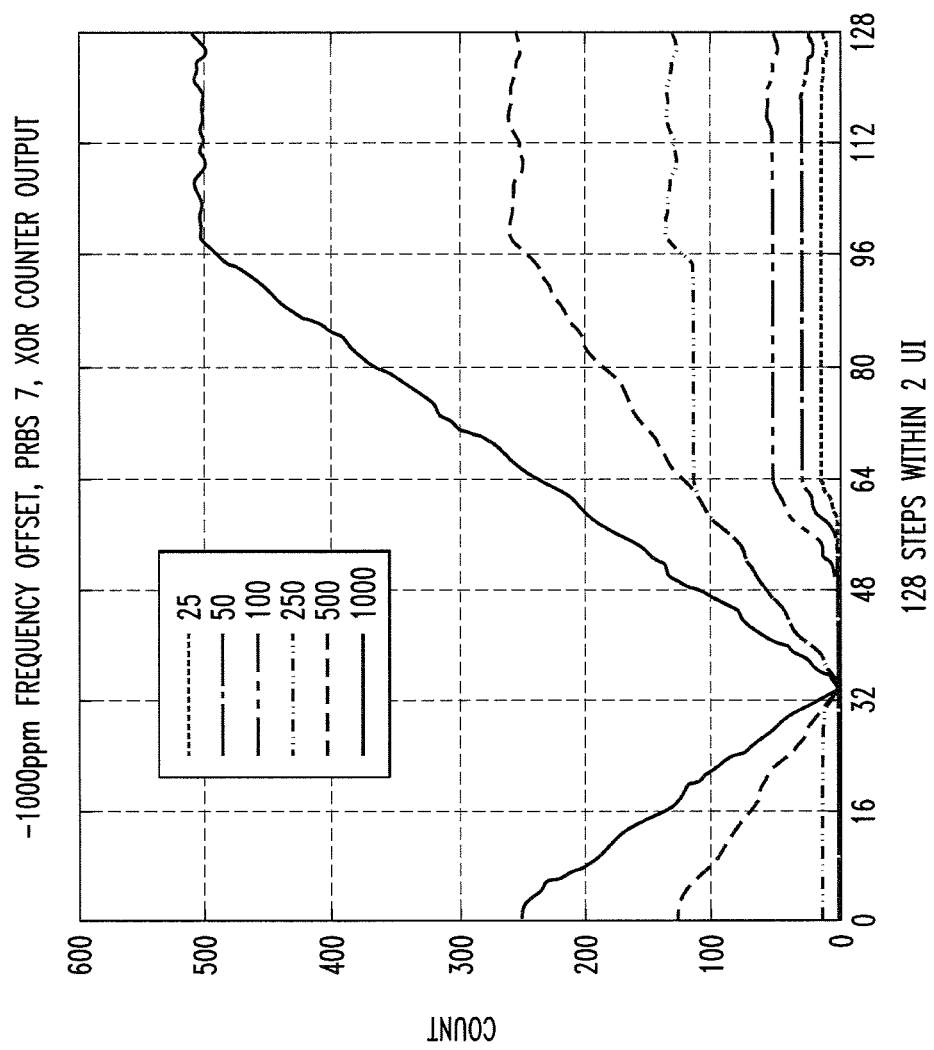
FIG. 11 shows results using a PRBS-7 for a given PPM offset, according to an embodiment of the invention.

When a PRBS pattern is used instead of the clock pattern, the effect of the PPM value exists and is similar to that of clock pattern. Therefore, one can elect to use a larger PPM absolute value for faster sweep or increase the count time. The count time should be chosen to be large enough to smooth out pattern dependence effects. This is shown in FIG. 11, from which one can conclude that there exists a relationship between counter size and data pattern. For a higher order of polynomials such as PRBS-31, to safely identify the data latch offset (the minimum value), one should use a much larger counter size. Another observation is that with a PRBS pattern, only the data latch of the current UI is located at the minimum value, the data latch of the other UI is not well defined. Though one may choose the knee of the bending curve as the location of the other data latch, such a selection may be acceptable, but not very precise. For that, we opt to use the two pass calibration procedure if the circuit does not have the second set of XOR gate and eye counter. On the first pass, the method obtains the exact position of the data latch of one UI. On the second pass, the method selects the other data latch to be combined with the roaming latch output and obtains the data latch position of the other UI.

Figure 12:
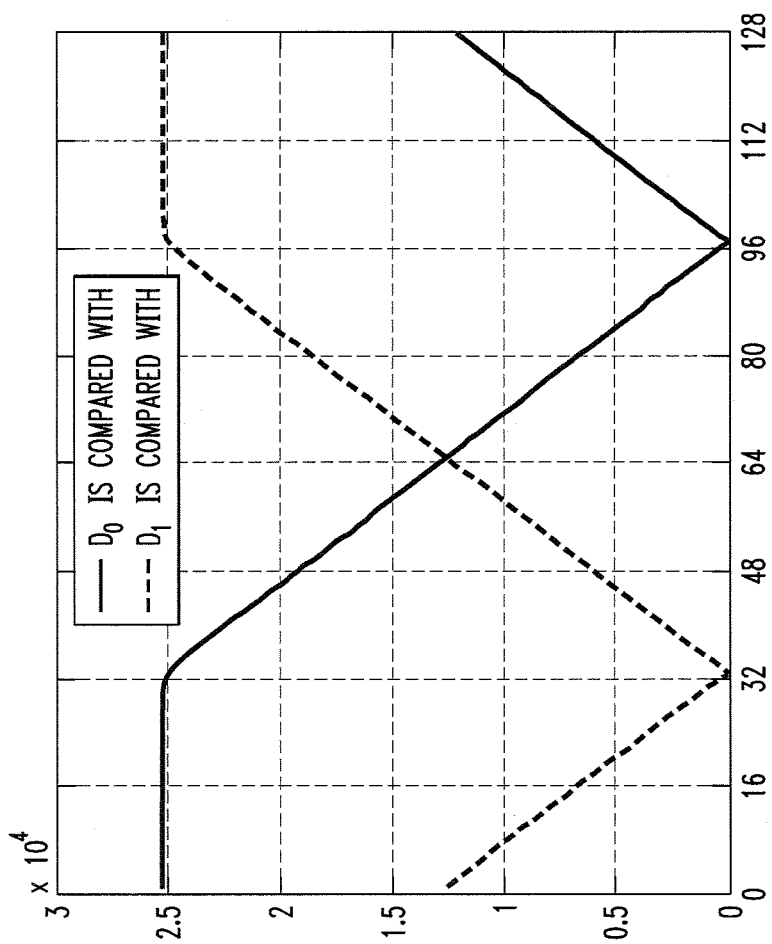
FIG. 12 shows a calibration plot using a PRBS-7 pattern, according to an embodiment of the invention.

It should be noted that since this method locates the latch positions independently, it is also applicable to the independent mode of a data latch adaptation method, where the two latches do not have a fixed phase offset. FIG. 12 shows the calibration method based on a PRBS-7 pattern.

Figure 13:
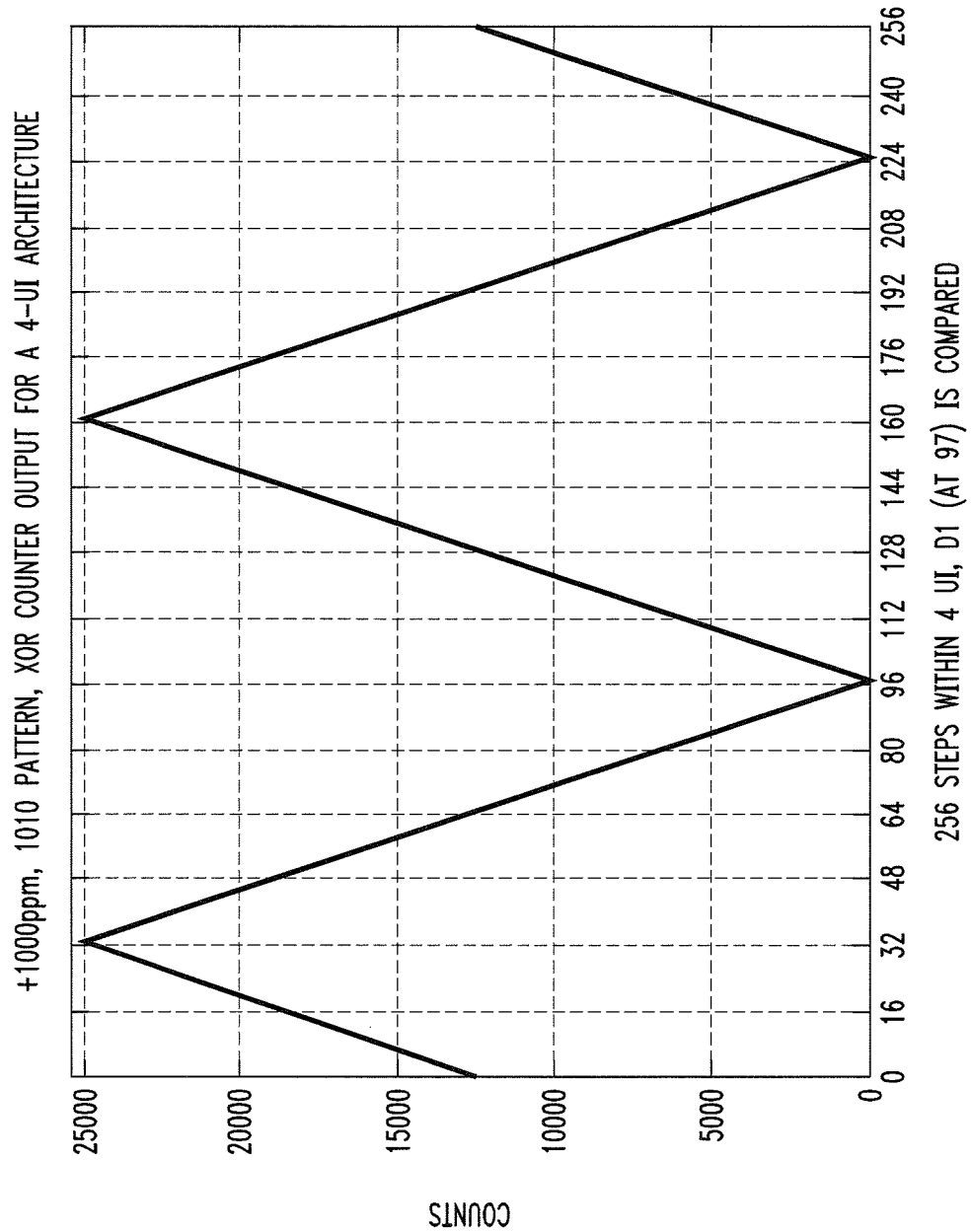
FIG. 13 shows a comparison with D1 data latch in a 4-UI system for a clock pattern, according to an embodiment of the invention.

The asynchronous calibration method for other receiver architectures can be similarly derived. Here we use a 4-UI architecture as an example. In FIG. 13, when a clock pattern is used as the calibration pattern and a fixed data latch array is used in the RX design, two minima and two maxima are identified by the roaming latch sweep. From the data latch multiplexer selection, one can relate each minima and maxima to a data latch in the four UI. However there is an underlying assumption that the relative roaming latch offset is small. Otherwise, one may not distinguish the two minima or the two maxima.

Figure 14:
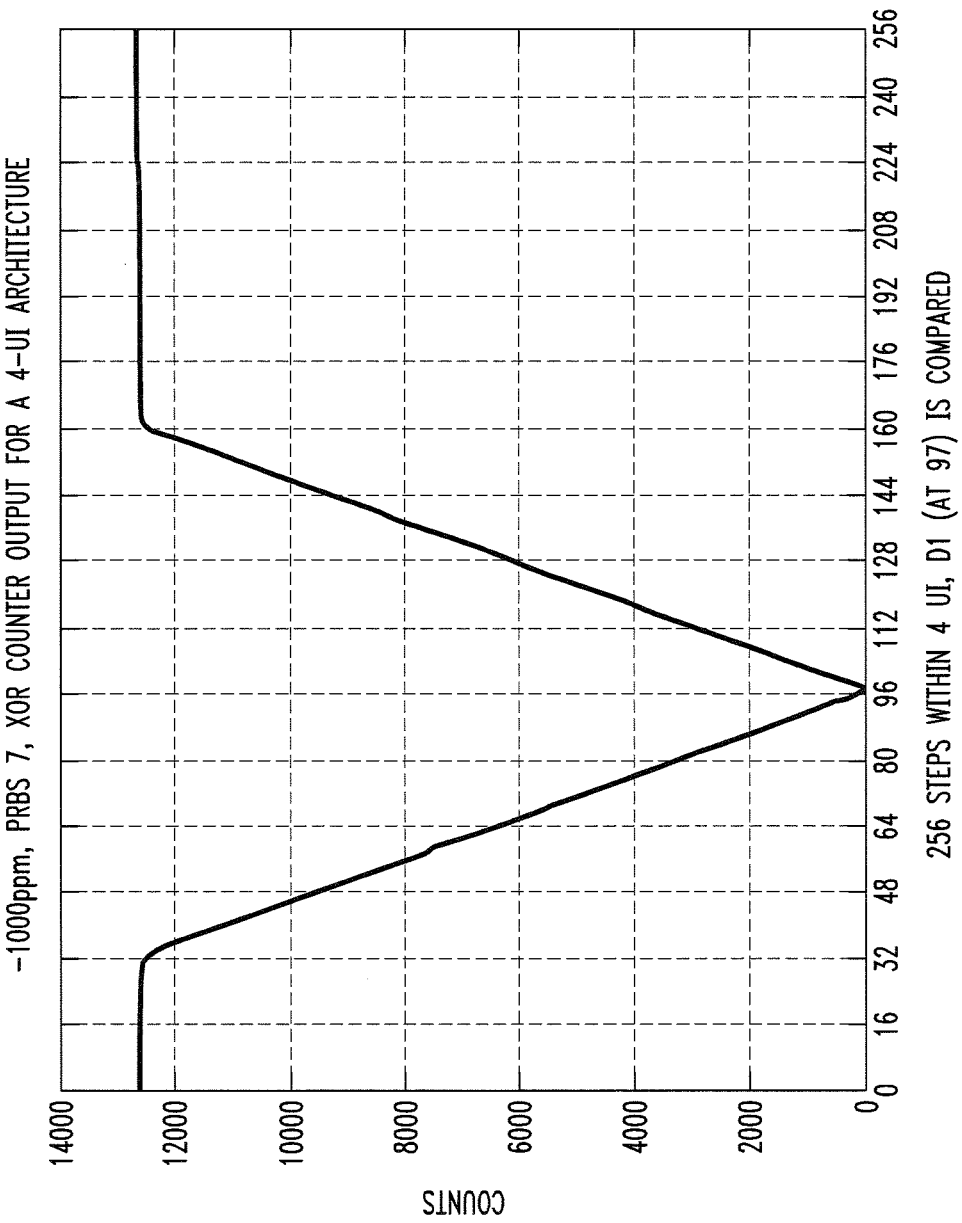
FIG. 14 shows a comparison with D1 data latch in a 4-UI system for a PRBS-7 pattern, according to an embodiment of the invention.

This issue can be resolved by switching to a PRBS pattern. As has been shown above, with PRBS patterns, only the selected data latch is identified by the minimum value. Therefore, there is no confusion as to the exact offset. For fixed data latch arrays, once this offset is obtained, all data latch positions are implied. Or one can complete the calibration with a multi-pass method. In contrast to the multi-pass method, one may have multiple XOR gates and counters running concurrently. In general, single-pass is acceptable in most situations. FIG. 14 shows the single latch offset identification using PRBS-7 pattern in a 4-UI system.

We now turn to an illustrative description of how an eye diagram can be generated based on the above-mentioned techniques such that receiver optimization may be achieved. Note that reference will be made back to circuit elements of FIG. 6.

Figures 15, 16:
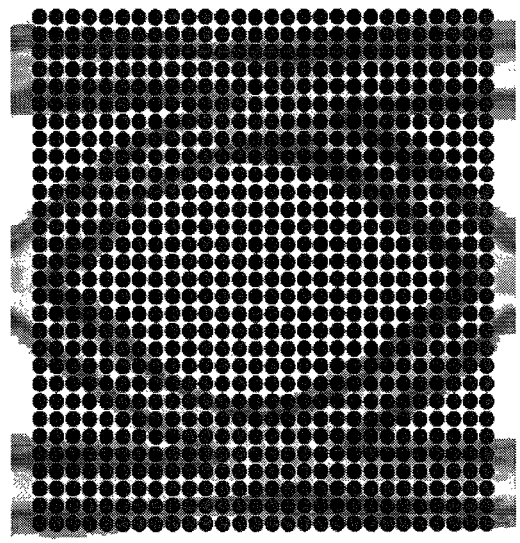
FIG. 15 shows an eye matrix for a roaming latch, according to an embodiment of the invention.
FIG. 16 shows a raw count and position on an eye matrix in ADC mode prior to color painting, according to an embodiment of the invention.

There are many ways to generate an eye diagram. Two examples of such methods are the ADC (analog-to-digital conversion) mode and the STAT (statistical) mode. In both modes, the roaming latch RL sweeps the entire eye matrix in amplitude (Y-axis) and phase (X-axis) as illustrated in FIG. 15. At each point in the matrix, the RL samples the received signal for a specified period. The test time at each point is determined by the data rate and a user-defined maximum bit counter. The bit counter may be implemented in programmable registers.

Referring back to FIG. 6, recall that eye counter D0 (646) and eye counter D1 (650) are responsible for gathering statistics in order to generate eye diagrams. Eye counter D0 (646) can generate an eye diagram for both the first and the second UI and operate in many modes including ADC and STAT modes. Eye counter D1 (650) is hardwired to the second UI and operates in the STAT mode only, as shown. However, one can easily replicate multiplexer (642) and feed the output to XOR (648) to enable other modes and UI for eye counter D1. The choice has more to do with hardware resource considerations, such as area and power. In the following, we use eye counter D0 as an example for the discussion.

Figure 17:
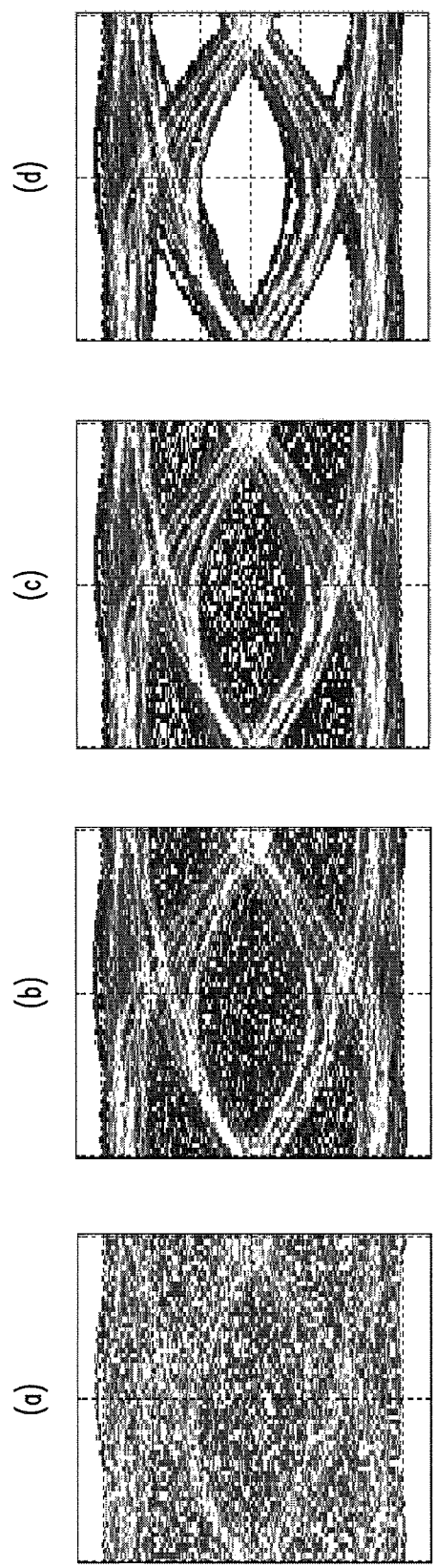
FIG. 17 shows simulated eye diagrams for four different counter sizes, according to an embodiment of the invention.

In ADC mode, the multiplexer 642 selects zero (0) as the input. Therefore, XOR gate (644) acts as a buffer for the roaming latch (620) output. When eye counter D0 (646) is enabled, it accumulates the number of ones (1s) from the RL over the specified period. It should also be noted that a constant one (1) can also be used. In that case, the XOR gate acts as an inverter and the eye counter accumulates the number of zeroes (0s) that the RL has sampled. To plot, one first builds a color map by defining ranges of count and selecting distinct color intensity for each range. This color map is then applied to paint each eye matrix point and an eye diagram is obtained as a result. FIG. 16 shows the raw count before the color map is applied, where the count-50 group corresponds to the eye opening. This method works well for DC (direct current) balanced short run length signals. If the input signal is not DC balanced or has long run lengths, the ADC eye will contain speckles in the open part of the eye which may or may not be real. For longer run length signals, one can increase the accumulation time to reduce the amount of false positive speckles. This is shown in FIG. 17. However a longer accumulation time also slows down receiver adaptation response time. That is, FIG. 17 shows simulated eye diagrams using a baseline architecture and a PRBS7 data pattern. From left to right, the counter sizes are 256 (FIG. 17(*a*)), 1024 (FIG. 17(*b*)), 8K (FIG. 17(*c*)) and 16K (FIG. 17(*d*)). Speckles are clearly visible for counter sizes less than 8K, thus degrading the quality of eye diagram significantly.

Figures 18, 19:
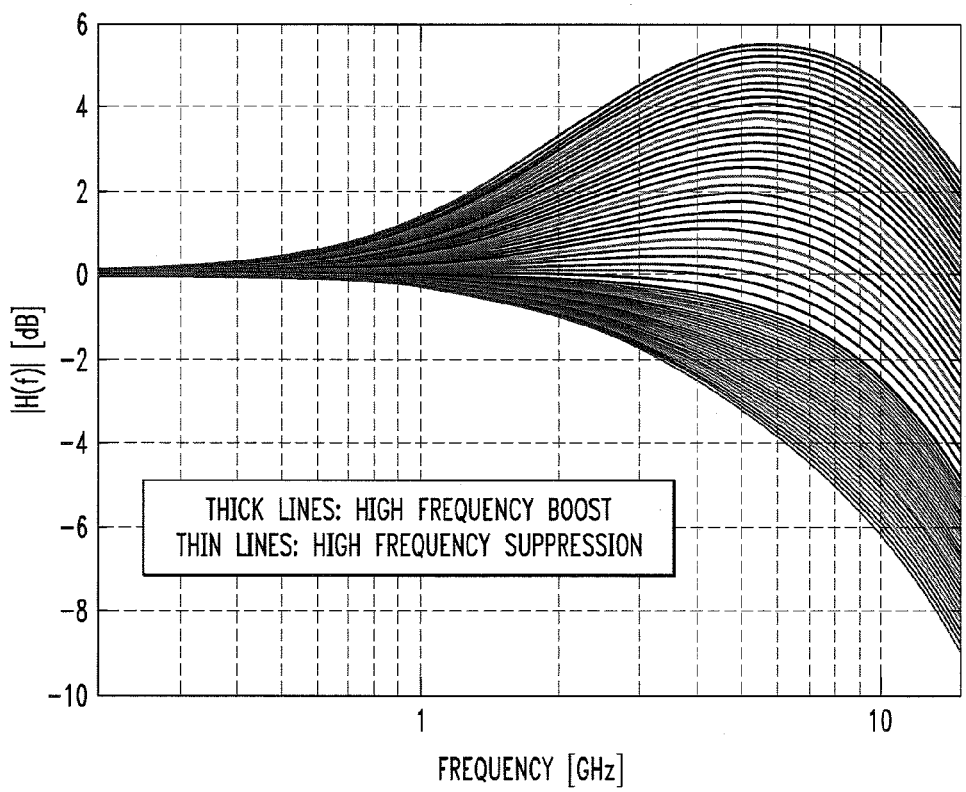
FIG. 18 shows a raw count and position on an eye matrix in STAT mode, according to an embodiment of the invention.
FIG. 19 shows selective frequency response of an analog linear equalizer, according to an embodiment of the invention.

In the STAT mode, the multiplexer (642) selects one of the data latch (D0 or D1) outputs. The eye counter D1 (650) is hardwired to STAT mode only. The output of the data latch and the roaming latch are XOR'ed (in 644 or 648) and the result is accumulated in the eye counters 646 and 650, respectively. To plot, one first builds a color map by defining ranges of count and selecting distinct color intensity for each range. This color map is then applied to paint each eye matrix point and an eye diagram is obtained as a result. FIG. 18 shows the raw count before the color map is applied, where the count-0 group corresponds to the eye opening.

It is realized that there are many tuning opportunities in the receiver through a quantitative study of the eye diagram. Here we use the analog linear equalizer (ALE) as an example. FIG. 19 shows a group of frequency response curves that can be used to either boost or suppress the high frequency gain. The default behavior of a traditional ALE is to boost the high frequency gain in order to compensate the high frequency loss suffered from the link. This is shown in FIG. 20. Note that the ALE is referred to as a continuous time linear equalizer (CTLE). The eye diagram can be used to quantify the adaptation result by measuring the eye opening size (i.e., width, height or a combination).

Figure 22:
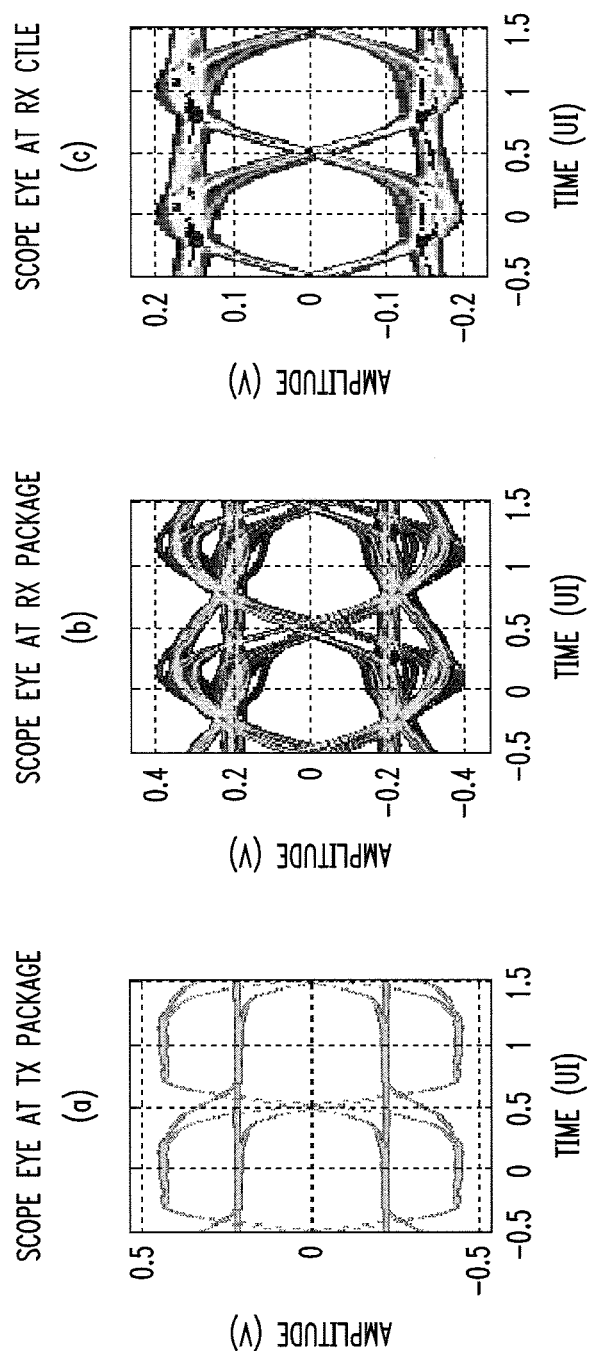
FIG. 22 shows an over-equalized received signal compensated by a suppression mode of a receiver linear equalizer with high frequency suppression, according to an embodiment of the invention.

However, if the TX pre-/de-emphasis is set too high (from factory preset for example), the received eye will suffer from signal overshoot. Over-emphasis leads to system performance degradation due to strong crosstalk. By measuring the ratio of the inner eye height to the outer eye height, one can utilize a high frequency suppression mode of the exemplary ALE to further open up the received eye and to reduce the amount of overshoot and crosstalk. This is shown in FIG. 21 and FIG. 22 for the effects using ALE with and without the suppression mode, respectively.

It is to be appreciated that, in an integrated circuit implementation of the invention, multiple integrated circuit dies are typically formed in a repeated pattern on a surface of a wafer. Each such die may include a device comprising calibration circuitry as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Advantageously, as described in detail above, illustrative embodiments of the invention provide accurate and reliable techniques for identifying roaming latch phase offset, thus avoiding the pitfalls of previous non-realistic one-size-fits-all schemes. The inventive technique directly calibrates the offset between the roaming latch and the data latch. Therefore, the inventive calibration technique does not need the transition latch position and then interpolate for the data latch position. Data latch position is the most used parameter in eye margining and masking. Further, the inventive calibration technique is applicable to both bang-bang and baud-rate CDR because only the data latch is required. The inventive calibration method can be integrated with existing software/hardware framework in a straightforward manner. Additional hardware requirement is minimal, since most of the counters or logic gates can be shared with existing adaptation circuits. The inventive calibration method improves the quality of software for margining, masking and adaptation, since a reliable and clean eye display is assured with PVT variations and data rates changes. The method is flexible and applicable to many architectures (2-UI and 4-UI architecture are described above, by way of example). A single pass approach is proposed for fixed latch array design, while a multi-pass approach is suggested for independent latch array. However, the invention does not require a specific approach to be used with a particular latch array. Fast calibration methods based on clock pattern and PRBS patterns are provided.

Again, it should be emphasized that the above-described embodiments of the invention are intended to be illustrative only. For example, other embodiments can use different types and arrangements of circuitry, control logic elements, processing elements and other circuit elements for implementing the described functionality. These and numerous other alternative embodiments within the scope of the following claims will be apparent to those skilled in the art.

What is claimed is:

1. A method for calibrating a process for generating a data eye visualization associated with a received signal, comprising steps of:
    obtaining samples of the received signal for a first unit interval using a first data latch and a roaming latch;
    measuring a delay offset between the first data latch and the roaming latch during a calibration process, wherein measuring comprises comparing at least one sample obtained using the first data latch and at least one sample obtained using the roaming latch; and
    using the measured delay offset to calibrate the process for generating the data eye visualization associated with the received signal.

2. The method of claim 1, further comprising steps of:
    obtaining samples of the received signal for at least a second unit interval using at least a second data latch and the roaming latch;
    measuring a delay offset between the second data latch and the roaming latch during the calibration process, wherein measuring comprises comparing at least one sample obtained using the second data latch and at least one sample obtained using the roaming latch; and using the determined delay offset between the samples of the first data latch and the roaming latch and the determined delay offset between the samples of the second data latch and the roaming latch to calibrate the process for generating the data eye visualization associated with the received signal.

3. The method of claim 1, wherein the received signal comprises a pseudorandom bit sequence.

4. The method of claim 1, wherein the received signal comprises a user-generated pattern bit sequence.

5. The method of claim 2, wherein the first data latch and the second data latch operate in a fixed mode.

6. The method of claim 5, wherein the first data latch is adapted in the first unit interval and the second data latch in the second unit interval moves in a synchronous manner with the first data latch.

7. The method of claim 5, wherein a phase offset between the first data latch and the second data latch is fixed at 180 degrees.

8. The method of claim 2, wherein the first data latch and the second data latch operate in an independent mode.

9. The method of claim 8, wherein the first data latch is adapted in the first unit interval and the second data latch is independently adapted in the second unit interval.

10. The method of claim 1, wherein the calibration method is used in accordance with a bang-bang clock and data recovery system.

11. The method of claim 1, wherein the calibration method is used in accordance with a baud-rate clock and data recovery system.

12. The method of claim 1, wherein the received signal is received from a transmitter operating asynchronously with respect to a receiver that receives the received signal and performs the calibration method.

13. The method of claim 12, wherein asynchronous operation is effectuated at the transmitter.

14. The method of claim 13, wherein the transmitter operates in a +/−PPM offset range and the receiver operates with a zero PPM offset.

15. The method of claim 12, wherein asynchronous operation is effectuated at the receiver.

16. The method of claim 15, wherein the receiver operates in a +/−PPM offset range and the transmitter operates with a zero PPM offset.

17. The method of claim 2, wherein a count is maintained based on the comparisons and, when the received signal comprises a clock pattern bit sequence, the minimum value of the count occurs at the phase position of the data latch being compared with the roaming latch and the maximum value of the count occurs at the phase position 180 degrees apart from the data latch being compared.

18. The method of claim 2, wherein a count is maintained based on the comparisons and, when the received signal comprises a pseudorandom bit sequence, the data latch of the current one of the first and second unit intervals is located at the minimum value of the count.

19. The method of claim 18, wherein in a multi-pass mode, a pass corresponds to a unit interval such that the minimum value of the count is determined for each unit interval during each pass.

20. The method of claim 19, wherein in a two unit interval latch array, the first data latch (D0) and the second data latch (D1) are designed 180 degrees apart such that: (i) when the data latch being compared is D0, the first data latch in the first unit interval, the minimum count value is the phase position of D0 and the maximum value of the count is the phase position of D1; and (ii) when the data latch being compared is D1, the second data latch in the second unit interval, the minimum value of the count is the phase position of D1 and the maximum value of the count is the phase position of D0.

21. A circuit for calibrating a process for generating a data eye visualization associated with a received signal, the circuit comprising:

a first data latch configured for obtaining samples of the received signal for a first unit interval;

a roaming latch configured for obtaining samples of the received signal for the first unit interval; and calibration circuitry configured for measuring a delay offset between the first data latch and the roaming latch during a calibration process, wherein measuring comprises comparing at least one sample obtained using the first data latch and at least one sample obtained using the roaming latch, and using the determined delay offset to calibrate the process for generating the data eye visualization associated with the received signal.

22. The circuit of claim 21, further comprising:

at least a second data latch configured for obtaining samples of the received signal for at least a second unit interval;

the roaming latch configured for obtaining samples of the received signal for the second unit interval; and the calibration circuitry configured for measuring a delay offset between the second data latch and the roaming latch during the calibration process, wherein measuring comprises comparing at least one sample obtained using the second data latch and at least one sample obtained using the roaming latch, and using the determined delay offset between the samples of the first data latch and the roaming latch and the determined delay offset between the samples of the second data latch and the roaming latch to calibrate the process for generating the data eye visualization associated with the received signal.

23. The circuit of claim 22, wherein the calibration circuitry comprises an XOR logic gate and a counter for sequentially performing the comparison between the samples of the first data latch and the roaming latch and the comparison between the samples of the second data latch and the roaming latch.

24. The circuit of claim 22, wherein the calibration circuitry comprises a first XOR logic gate and a first counter for performing the comparison between the samples of the first data latch and the roaming latch, and a second XOR logic gate and a second counter for performing the comparison between the samples of the second data latch and the roaming latch.

25. An integrated circuit comprising the first data latch, the second data latch, the roaming latch, and the calibration circuitry of claim 2.

* * * * *